No. 766,439. PATENTED AUG. 2, 1904.
H. J. GILBERT.
PULLEY.
APPLICATION FILED JUNE 8, 1903.
NO MODEL.
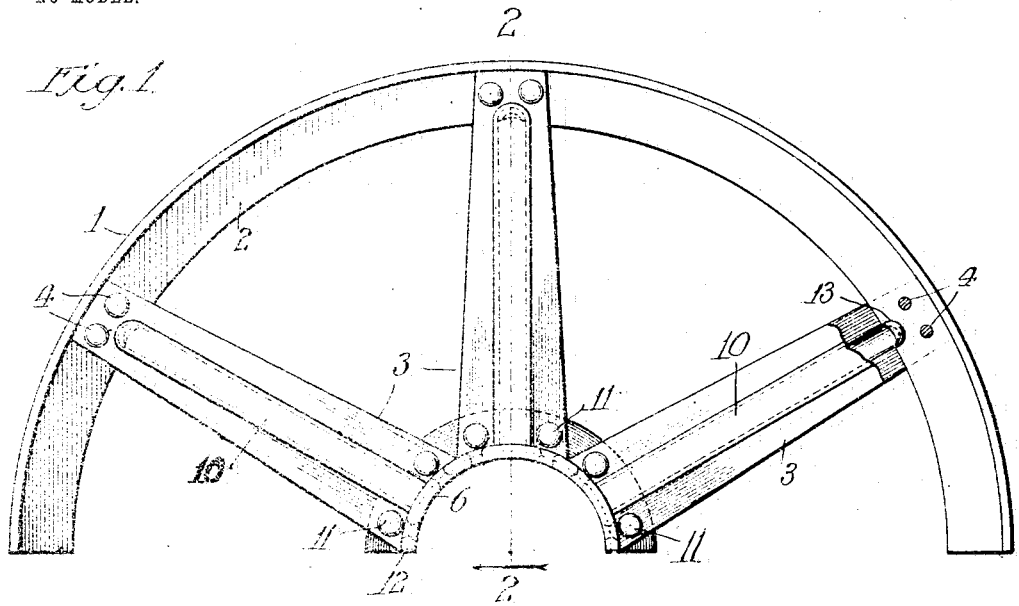
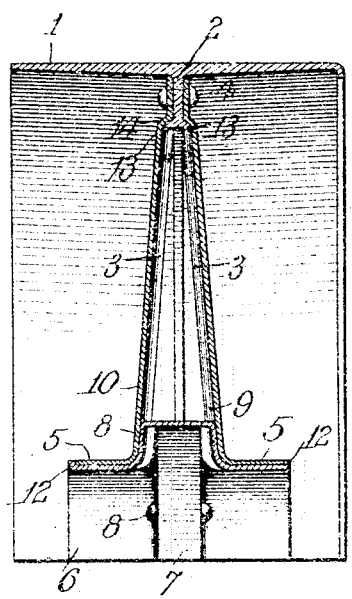
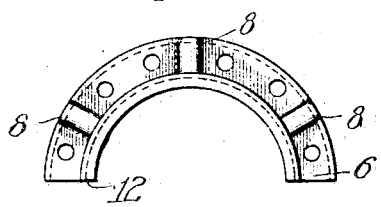
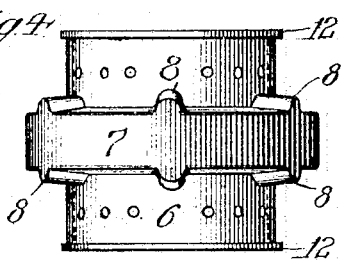
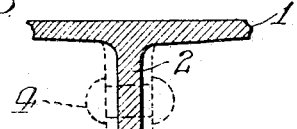
Witnesses:
Edw. P. Barrett
Harold E. Barrett
Inventor:
H. J. Gilbert
By Rector & Hibben
His Attorneys No. 766,439. Patented August 2, 1904.

UNITED STATES PATENT OFFICE.

HENRY J. GILBERT, OF SAGINAW, MICHIGAN.

PULLEY.

SPECIFICATION forming part of Letters Patent No. 766,439, dated August 2, 1904.

Application filed June 8, 1903. Serial No. 160,523. (No model.)

*To all whom it may concern:*

Be it known that I, HENRY J. GILBERT, residing at Saginaw, Saginaw county, Michigan, have invented certain new and useful Improvements in Pulleys, of which the following is a specification.

My invention pertains to pulleys, wheels, and the like, both of the solid and sectional type; and the object thereof is to produce a durable and efficient pulley made of sheet metal and of great strength and rigidity.

Without intention of limiting myself I have illustrated and will now describe my invention as embodied in a pulley of the split or sectional type.

In the accompanying drawings, Figure 1 is an elevation of a section of my pulley with the outer end of one spoke broken away; Fig. 2, a section on the line 2 2 of Fig. 1; Fig. 3, an end view of the hub-thimble; Fig. 4, a plan view thereof, and Fig. 5 a detail view of a portion of the web.

As herein shown, the pulley is made in two sections, the upper half only being shown. The rim 1 is provided in suitable manner with an inwardly-directly flange or web 2, arranged centrally or substantially so of the rim. A series of spokes 3, arranged in pairs opposite or facing each other, are secured at their outer ends to the web 2 by means of rivets 4, while their inner ends 5 are outwardly flanged at substantially right angles to form a part of the hub structure, as shown clearly in Fig. 2.

The hub-thimble 6 is of novel and peculiar construction, the same consisting of a shell with a circumferentially-expanded portion 7, which is provided on opposite sides with a series of radial ribs 8. These ribs are adapted to be received by the grooves 9, formed by the ribs 10 of the spokes, and consequently these radial ribs 8 correspond in position to the spokes. The several parts of the hub structure are secured together in suitable manner, as by means of rivets 11 passing through the spokes and expanded portion of the hub-thimble. The expanded portion 7 of the hub-thimble extends radially between the inner ends of the spokes, thereby distancing and supporting them, while the arrangement of the ribs and grooves just described interlocks the parts and holds them rigid as well as relieves the rivets of shearing strain.

The inner ends 5 of the spokes are extended laterally, as described, and fit upon the outer surface of the hub-thimble, thereby constituting a component part of the hub structure. By preference, though not of necessity, the ends of the hub-thimble are rolled outwardly to form lips or flanges 12 of the same width as the thickness of the spoke ends 5, with the result that such spoke ends abut the flanges and the further result that smooth edges are formed.

For the purpose of firmly securing and supporting the outer ends of the spokes, and thereby increasing the strength and rigidity of the pulley, the web 2 is swaged laterally at intervals where the spokes are attached, so as to form lateral projections or curved flanges 13, which are received by the upper ends of the grooves 10, formed by the ribs of the spokes. These flanges correspond in size and shape to the extreme ends or curved shoulders 14 at the outer ends of the grooves 10, and thereby firmly support the outer ends of the spokes and at the same time afford an interlocking of parts, whereby the pulley is materially strengthened and the rivets 4 relieved of shearing strain caused by torsional and centrifugal forces. So far as this feature of the interlocking of the outer ends of the spokes as just described is concerned the form of construction of the web on the rim, as well as the manner of construction thereof, is entirely immaterial.

It will be understood that the other half or section of the pulley is constructed similar to the one just described and that the two are held together by the usual rim-clamps and hub-clamps.

My pulley can be made wholly of sheet metal, which is readily formed and shaped, as hereinbefore described, with the result that lightness and durability are obtained without sacrifice of strength and rigidity.

I claim—

1. A pulley comprising a rim, a series of spokes having longitudinal ribs forming grooves on their inner faces, such spokes being connected to the rim at their outer ends and having their inner ends outwardly flanged to form a part of the hub structure, and a hub-thimble having a circumferentially-expanded portion extending between the spokes and provided with a series of ribs received by the grooves of the spokes; substantially as described.

2. A pulley comprising a rim, a series of spokes having longitudinal ribs forming grooves on their inner faces, such spokes being connected to the rim at their outer ends and having their inner ends outwardly flanged to form a part of the hub structure, and a hub-thimble having a circumferentially-expanded portion extending radially between the spokes and provided with a series of radial ribs received by the grooves of the spokes, and rivets passing through the spokes and expanded portion of the hub-thimble; substantially as described.

3. A pulley comprising a rim, a series of spokes having longitudinal ribs forming grooves on their inner faces, such spokes being connected to the rim at their outer ends and having their inner ends outwardly flanged to form a part of the hub structure, and a hub-thimble having a circumferentially-expanded portion extending between the spokes and having flanges 12 at its ends, the inner or flanged ends of the spokes fitting upon the outer surface of the hub-thimble and abutting said flanges 12, there being ribs or corrugations formed on opposite sides of said expanded portion of the hub-thimble and received by the grooves of the spokes; substantially as described.

4. A pulley comprising a rim having an interior web, a hub structure, a series of spokes connected to the rim and hub structure respectively, and a series of projections arranged on the web to engage or lock with the spokes; substantially as described.

5. A pulley comprising a rim having an interior web, a hub structure, and a series of spokes connected to the rim and hub structure respectively, there being laterally-directed flanges on the web to engage the spokes; substantially as described.

6. A pulley comprising a rim having an interior web, a hub structure, and a series of spokes connected to the rim and hub structure respectively, and having longitudinal ribs to form grooves on their inner face, there being a series of lateral flanges swaged from the body of the web and received by the grooves of the spokes; substantially as described.

7. A pulley comprising a rim having an interior web, a hub structure, a series of spokes connected to the rim and hub structure respectively, and having longitudinal ribs to form grooves 10 having curved shoulders 14 at their outer ends, there being a series of lateral projections or flanges 13, swaged laterally from the body of the web and arranged to fit against said shoulders 14, and rivets 4 for securing the spokes and web together; substantially as described.

8. A pulley comprising a rim, a series of spokes connected at their outer ends to the rim and having their inner ends outwardly flanged to form a part of the hub structure, a hub-thimble upon which such flanged ends of the spokes fit, such thimble having end flanges 12 against which the ends of the flanges of the spokes abut, and means for securing the spokes and thimble together; substantially as described.

9. A pulley comprising a rim having an interior web, a hub, and a series of spokes connected at their ends to the rim and hub respectively, such spokes being arranged in pairs and having longitudinal corrugations commencing near their outer ends to form inside grooves adjacent the inner edge of said web which has a series of lateral flanges extending on both sides thereof and arranged to fit the outer ends of said grooves.

10. A pulley comprising a rim, a series of spokes connected at their outer ends to the rim, and a hub-thimble to which the inner ends of such spokes are connected and having a circumferential expanded portion which is provided with a series of projections arranged to interlock with the inner ends of the spokes; substantially as described.

HENRY J. GILBERT.

Witnesses:
S. E. HIBBEN,
LOUIS B. ERWIN.